Figure 5:
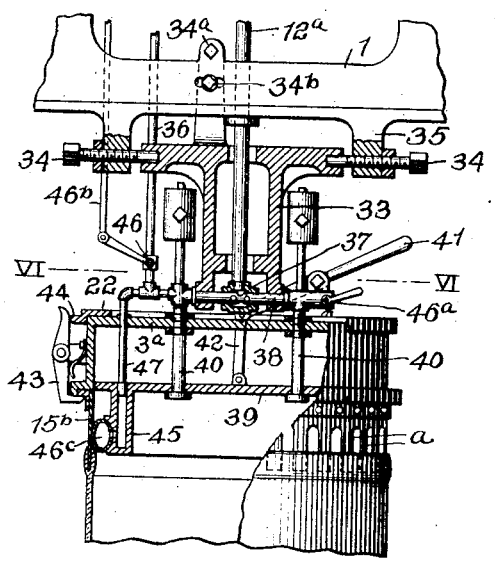

F. L. O. WADSWORTH.
DRAWING GLASS CYLINDERS.
APPLICATION FILED MAY 9, 1908.
1,161,911.
Patented Nov. 30, 1915.
3 SHEETS—SHEET 1.
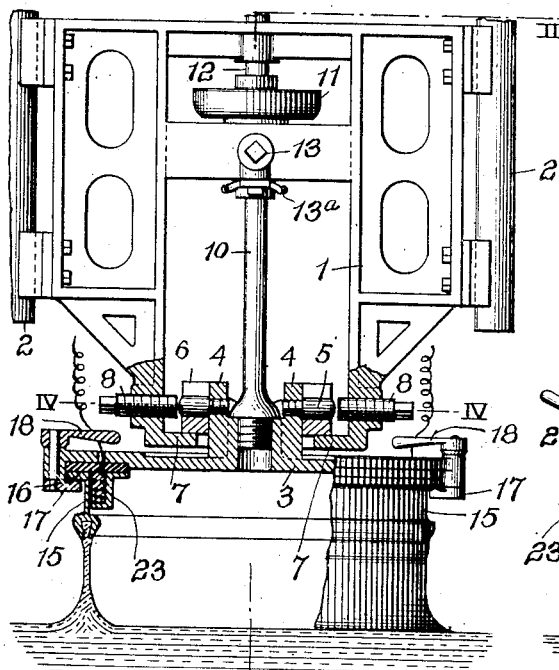
FIG. 1.
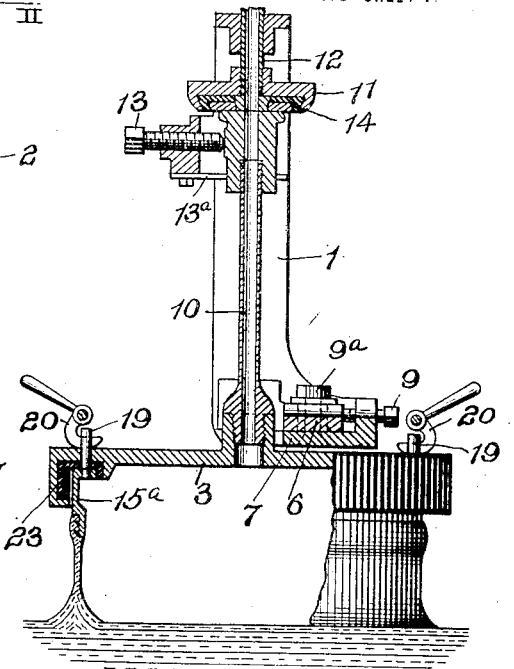
FIG. 2.
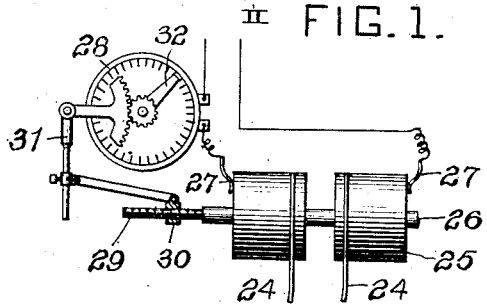
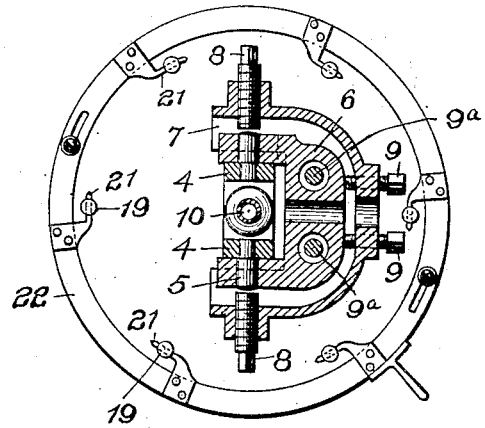
FIG. 4.
FIG. 3.
WITNESSES
J. Herbert Bradley
Francis J. Tomasson
INVENTOR
Frank L. O. Wadsworth,
by Christy & Christy,
Attys.

F. L. O. WADSWORTH.
DRAWING GLASS CYLINDERS.
APPLICATION FILED MAY 9, 1908.

1,161,911.

Patented Nov. 30, 1915.
3 SHEETS—SHEET 2.

WITNESSES:

INVENTOR
Frank L. O. Wadsworth,
by Christy & Christy, Atty's

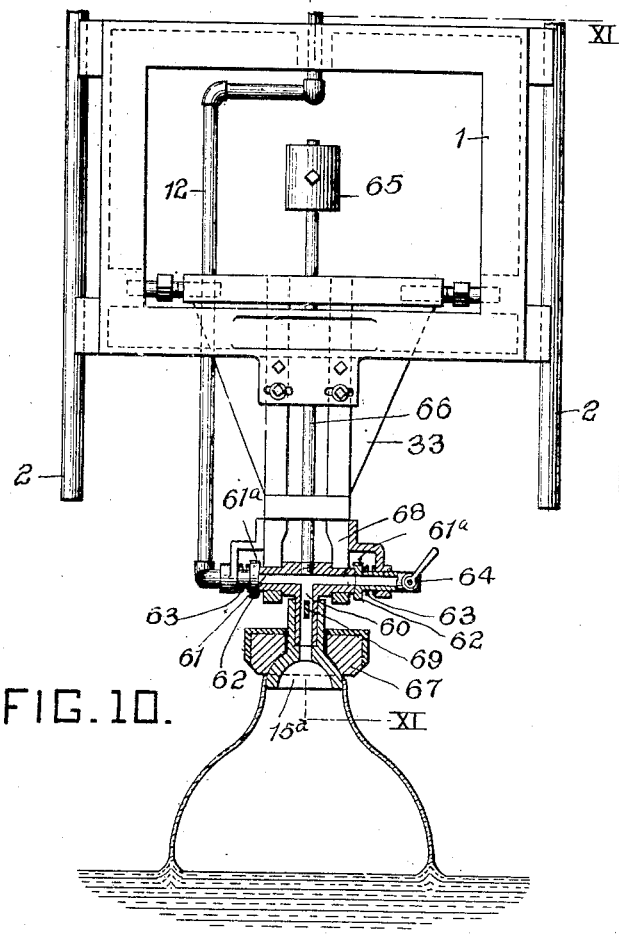
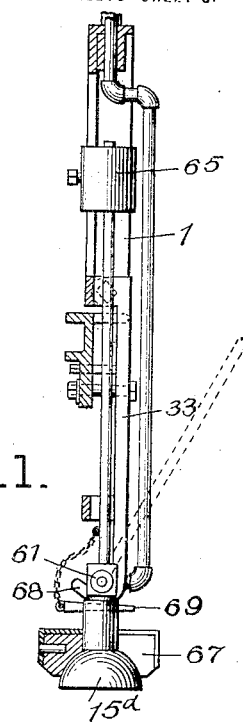

UNITED STATES PATENT OFFICE.

FRANK L. O. WADSWORTH, OF SEWICKLEY, PENNSYLVANIA.

DRAWING GLASS CYLINDERS.

1,161,911.   Specification of Letters Patent.   Patented Nov. 30, 1915.

Application filed May 9, 1908. Serial No. 431,864.

*To all whom it may concern:*

Be it known that I, FRANK L. O. WADSWORTH, residing at Sewickley, in the county of Allegheny and State of Pennsylvania, a citizen of the United States, have invented or discovered certain new and useful Improvements in Drawing Glass Cylinders, of which improvements the following is a specification.

The invention described herein relates to certain improvements in mechanism for drawing glass cylinders, and has for its object the maintenance of uniformity in the changes of dimensions of bait and cylinder being drawn.

It is further the object of the invention to provide for the accurate adjustment of the drawing head, to also provide for the quick and easy detachment of the bait and cylinder from the drawing mechanism, and also to provide for the easy manipulation and shifting of the completed cylinder.

The invention is hereinafter more fully described and claimed.

Figure 6:
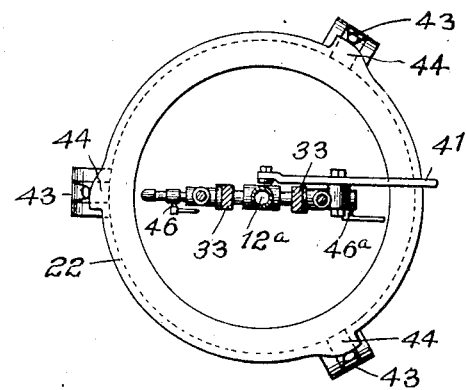
Figure 7:
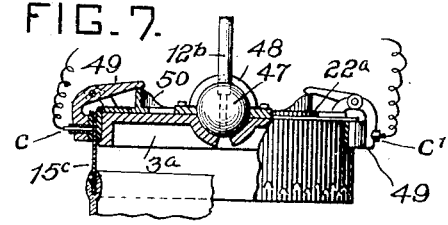
Figure 9:
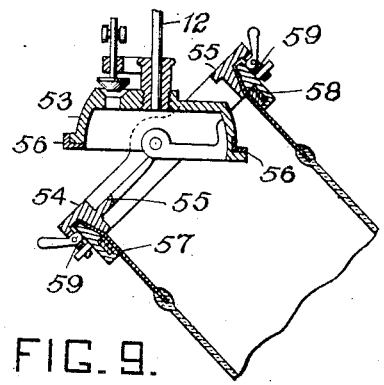
Figure 8:
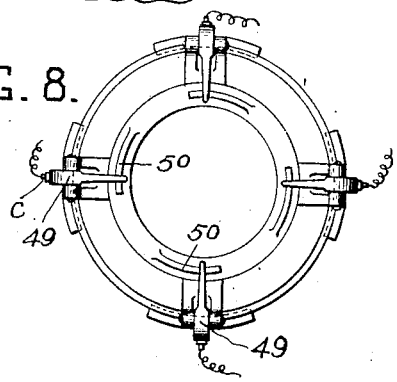

In the accompanying drawings forming a part of this specification, Figure 1 is a view partly in elevation and partly in section of a drawing head and bait and illustrating a form of my improvement; Fig. 2 is a sectional view on a plane indicated by the line II—II of Fig. 1; Fig. 3 is a view showing the construction of bait and drawing head illustrated in Fig. 1, and also showing a means for shifting the drawing head and controlling the electric heater for regulating the temperature of the bait; Fig. 4 is a sectional plan on a plane indicated by the line IV—IV of Fig. 1, but showing a modification in the manner of connecting the bait to the drawing head; Fig. 5 is a view partly in elevation and partly in section of a drawing head and bait, illustrating modifications in the structure of both parts and in the manner of connecting the bait to the head; Fig. 6 is a sectional plan view on a plane indicated by the line VI—VI of Fig. 5; Figs. 7 and 8 are a sectional elevation and a plan respectively, illustrating modifications in the manner of connecting the bait to the drawing head; Fig. 9 is a view partly in section and partly in elevation illustrating another modification in the head and the manner of securing the bait thereto; Fig. 10 is a view partly in elevation and partly in section, illustrating a modification of the construction shown in Fig. 5; Fig. 11 is a sectional elevation on a plane indicated by the line XI—XI of Fig. 10.

In the construction shown in Figs. 1, 2 and 3 the cage frame 1 is mounted in suitable guides 2 so as to insure uniformity of movement in the drawing of glass. The drawing head 3 is provided with two upwardly-extending lugs 4 4, to which are secured pivot pins 5 engaging the arms of a forked bearing plate 6 resting, as shown in Figs. 1, 2 and 4, upon the flange 7 of the U-shaped lower end of the cage frame. This construction, as shown in Fig. 3, will permit of the swinging of the head and bait and attached cylinder to an angular position relatively to the line of draw of the cylinder, when the latter is to be taken down and removed. As is clearly shown in Figs. 1, 2 and 4, the bearing plate 6 can be adjusted in position in both directions, so as to bring the axis of the drawing head and bait to any desired position relatively to the cage frame, by means of screws 8 8 and 9 9, and clamped in this position by means of bolts $9^c$. An opening is left between the lugs 4 4 of the drawing-head for the reception of the blow-pipe 10, which extends upwardly and terminates in a cap adapted to slide under the annular block or head 11 carried by the supply pipe 12, which is connected in any suitable manner to a blowing device. The movement of the pipe 10 is limited by an adjustable stop 13, against which it may be held by a forked spring clip $13^a$. The head 11 on the supply pipe 12 is provided with a suitable yielding packing 14, with which the upper end of the pipe 10 will make a close joint in any operative position of the drawing head.

In the construction shown in Fig. 1 the bait 15 is formed of thin sheet metal, and is provided with an outwardly extending flange 16, under which the turn-buttons 17 pivotally mounted in the drawing head 3 will pass, thereby securing the bait to the head in such manner as will permit the ready and easy attachment and detachment of the bait and head by simply turning the handles 18 of the buttons. In the construction shown in Fig. 2 the bait 15ª is provided with pins 19 which will project up through the drawing-head and have slots therethrough for the reception of the pivoted hooks 20, whereby the bait is secured to the drawing-head. In the construction shown in Fig. 4 the pins 19 are engaged by fingers 21 secured to a ring 22 movably mounted upon the drawing-head. By the rotation of this ring these fingers are caused to engage or disengage the pins as required.

As is well known in the art, the rates of the temperature changes in the dimensions of the bait and the glass cylinder attached thereto, are different, the contraction or cooling of the bait being as a rule more rapid than that of the glass, so that the latter is put under considerable strain and is frequently broken by the contraction of the bait. In order to overcome this difficulty I provide in the construction shown in Figs. 1, 2, 3 and 4 a suitable heater, which may be of any desired form or construction, whereby the rate of cooling of the bait may be controlled and its contraction made to conform with the contraction of the glass. A desirable construction to this end consists of an electric heater 23, which may be arranged inside of the bait as shown in Fig. 1, or outside thereof as shown in Fig. 2. This heater is connected to a suitable generator in any suitable manner, conveniently by the wire ropes employed in drawing up the cage frame 1, as shown in Fig. 3. The ropes 24 are connected to but insulated from the cage frame 1, and are wound on metallic drums 25 mounted on but insulated from the driving shaft 26. These drums are electrically connected by brushes 27 with a suitable generator, and a rheostat 28 is included in the circuit of the generator. This rheostat is automatically adjusted to the requirements of the work through the driving shaft 26, said shaft being provided with a threaded stem 29, having a threaded block 30 mounted thereon and connected to one arm of a bell crank 31, the other arm carrying a toothed segment engaging a pinion for operating the movable member 32 of the rheostat. In this construction the current through the heater will be gradually varied as the drawing progresses and the portion of the glass cylinder in engagement with the bait cools down, so that the contraction of the bait is retarded and made to coincide with the more gradual natural contraction of the glass.

This construction of the drawing-head and bait permits of the easy swinging of the drawn cylinder out of the line of draw, without disengagement of the drawing head from its support, and further permits of the movement of the cylinder into a position where it can be readily taken away from the drawing mechanism by the detachment of the bait from the drawing head.

In the construction shown in Fig. 5 the cage frame 1 is provided with a bearing fork 33 similar in function to the forked bearing plate 6 of Figs. 1, 2 and 4. This bearing fork is pivotally mounted on pins 34 screwing through lugs 35 on the cage frame, and is held in any desired position by means of a set screw 34ª and a clamp bolt 34ᵇ both engaging with the upper arm of the bearing fork 33. By this construction this fork can be adjusted and clamped as before in any desired position relatively to the cage frame. The air supply pipe 12ª extends down through slots in the bearing fork, and is provided at its lower end with a head or enlargement 37, through which passes a pipe 38 having its portion within the head perforated. This pipe 38 is pivotally mounted in lugs on the lower end of the bearing fork, so that the drawing-head 3ª can be swung to one side or the other as required without disengagement from its support. In this construction shown in Fig. 5 the drawing head consists of two parts, an upper portion 3ª which is made hollow and a lower sealing disk 39, movable up and down within the first part. The upper portion is secured by nuts, as shown, to branch pipes 40 on the ends of the pivotal pipe 38, and the disk 39 is movably supported on the upper head by means of the lever 41 connected to the latter by a link 42. The bait 15ᵇ is provided with an outwardly projecting flange for engagement with hooks 43 pivotally mounted on the head 3ª, and adapted to be shifted to engage the flange of the bait by means of cam plates 44 on the ring 22 mounted on the drawing-head. As shown, the bait 15ᵇ consists of a series of resilient fingers a secured to the flange as above stated. Ordinarily these resilient fingers will accommodate themselves automatically and by reason of their resilience to changes of dimensions of the glass cylinder due to its cooling. As will be seen by reference to Fig. 5, these spring fingers are only in engagement with the glass at their lower ends, so that unless provision is made for closing the slots between the fingers above the plane of the glass, no material pressure could be maintained within the cylinder. A sealing of the cylinder for the maintenance of this internal pressure is effected by means of the movable disk 39, which is provided with a downwardly extending hollow flange 45 having secured on its outer face a collapsible annular packing 46ᶜ. The annular flange is connected to a pipe 47 which may connect with the pipe 38, but preferably is connected to an independent source of fluid pressure. When starting the operation of drawing a cylinder, the disk 39 is drawn up within the head 3ª, until a short section of glass cylinder has been formed and the bait is above the surface of the glass in the drawing pot. The disk 39 is then moved down until its packing ring will bear against the upper edge of the glass on the spring fingers and thereby close the upper end of the glass cylinder as against any escape of fluid pressure therefrom. The pipe 47 is provided with a valve 46 controlled by a valve rod 46ᵇ, and by connecting this rod with the drawing mechanism the pressure of the fluid within the packing 46ᶜ, and the consequent pressure of this packing against the resilient fingers of the bait, may be controlled at will, thus aiding in the maintenance of substantial uniformity in diameter between the bait and the glass cylinder as the latter cools. The pipe 38 may also be provided with an escape port controlled by a valve 46ª, to allow of the control in part of the fluid pressure within the cylinder.

In Fig. 7 the pivotal movement of the drawing head and bait is secured by providing the drawing head 3ª with a segmental spherical socket 47 for the reception of a ball on the end of the pipe 12ᵇ, the ball being held within the socket by a cap 48 bolted to the socket as shown. This cap is slotted so as to permit of the drawing-head being rotated as before to an angular position with relation to the cage without disengagement from the latter, when the glass cylinder is to be taken down and removed from the drawing mechanism. The bait 15ᶜ of this construction is made of thin metal having projections near its lower end for engagement with the glass, and is secured to the outside of the drawing-head by means of pivoted clamps 49, which are shifted to grip the bait by means of cam plates 50 on a ring 22ª mounted on the drawing head. In this construction the bait is insulated from the bait head and also from the clamps, and is heated by electric currents which pass directly through the metal of the bait itself, said bait being connected directly in circuit with the generator and controlling rheostat, by means of diametrically opposite contacts c c'.

In the construction shown in Fig. 9 the drawing-head is formed in two sections, one a segmental spherical portion 53 secured to the supply pipe 12, and a ring portion 54 mounted on trunnions extending from the portion 53. The ring portion is provided with inwardly projecting flanges 55 adapted to engage, when the ring is in operative position, with the upper and lower surfaces, respectively, of a flange 56 on the lower end of the central portion. This form of drawing-head permits of the bait and the attached cylinder being readily shifted, as in the previous constructions, to an angular position with relation to the line of draw without disengaging the drawing-head from its supports. In this construction the entire bait is formed of comparatively thin metal and has its upper end flared to fit over the conical flange 57 on the ring 54. The upper portion of the bait is clamped against this conical flange by a sectional ring 58 supported on the ring 54 and movable relatively thereto to clamp the bait by dogs 59. In this construction the ring sections 58 are provided with internal recesses for the reception of an electric heater to regulate the contraction of the bait as heretofore described.

The construction shown in Figs. 10 and 11 is another modification in which a small bait 15ᵈ is detachably connected by a wedge 69 to a drawing head 60 pivotally mounted on the adjustable bearing fork or extension 33 on the cage frame. The head 60 is provided with trunnions 61 mounted in open-forked bearings 68 in the section 33, and is provided with passages for the air introduced through one of the trunnions from the supply pipe 12, carried by the cage frame. The supply pipe is provided with a head 61 yieldingly pressed against the end of one of the trunnions by a spring 63, while a head 64 is similarly pressed against the opposite trunnion, said head having a passage therethrough controlled by a valve 64 for the escape of air from the cylinder. In this construction as in previous ones the drawing-head is supported near its center of gravity, the mass of the bait being compensated by a weight 65 on the rod 66 secured to the head 60, said weight being adjusted to counterbalance or nearly counterbalance the mass of the bait. In taking down the cylinder the drawing head will swing on the trunnions 61 until the cylinder has been lowered to the proper position, and the latter may then be disconnected and removed from the drawing mechanism, either by removing the wedge 69 and detaching the bait 15ᵈ, or by slipping the whole head out of the supporting forks 68.

In the operation of the invention, the bait is attached to the drawing-head and the latter is lowered by the drawing mechanism attached to the cage until the lower edge of the bait dips into the molten glass from which the cylinder is to be drawn. The bait being in such case very thin and light it very quickly assumes the exact temperature of the glass in which it is immersed and becomes in consequence strongly welded thereto. The drawing mechanism is then put in motion and the bait with its attached cylinder of glass drawn upwardly in the usual manner. As the drawing proceeds the glass in contact with the bait gradually cools and contracts, but owing to the very low heat conductivity of this material, the rate of cooling and contraction is not uniform but varies to a great degree at different parts of the draw. This has heretofore been the cause of much trouble. It can only be completely overcome by regulating the contraction of the bait so that the latter is caused to always maintain the same size as that part of the glass cylinder with which it is in contact, this regulation being such as to just compensate for the inequalities in the rate and the amount of contraction of the bait and the glass. This is provided for in my invention by the means of regulation already described. When the cylinder is drawn to the required length the lower end is severed from the bath and swung outward, the drawing cage being simultaneously lowered until the cylinder has assumed a nearly horizontal position. With the arrangement of parts herein described this is very easily done without throwing any strain on the upper end of the cylinder, by reason of the pivotal mounting of the drawing head and bait at a point near the center of gravity of the system. When the cylinder has reached the lowest position it is readily disconnected from the drawing mechanism by simply detaching the bait from the head, and removing cylinder and bait together to the horses on which the cylinder is subsequently capped off into lengths suitable for flattening. A new bait is then attached to the drawing-head and the process repeated.

It will be readily appreciated by those skilled in the art that this method of operation is very much more rapid, easier of control and subject to less loss by reason of breakage than any now in use. It will also be obvious that all of the forms of apparatus have certain mechanical features in common and possess advantages characteristic of those common features, for example (1) Drawing head is pivotally mounted near its center of gravity, and can be rotated with relation to the cage frame of the drawing mechanism without detaching it from its support thereon and without throwing any strain on the part of the glass cylinder to which it is attached. By reason of this free pivotal mounting the drawing head will also automatically adjust itself during the draw so as to always exert an equable pull on the two sides of the glass cylinder, regardless of variations in the line of draw and regardless of inequalities in the linear surface contraction of the glass.

(2) Cylinder can be readily detached from drawing mechanism by removing the bait from the drawing head without in any way disturbing the latter.

(3) The bait proper is a small light mass of metal, which does not unduly load and strain the glass cylinder, either during the process of formation, or subsequently while it is being taken down and cracked off from the finished cylinder. Being so light, it does not require to be heated before it is immersed in the glass bath preparatory to drawing the cylinder, and it can therefore be kept clean and handled much more readily than the large cumbersome blowpipes now in use.

(4) There is no strain due to the unequal contraction of the previously heated bait and the cooling glass, during the progress of drawing. The tendency to the normally more rapid contraction of the metal bait is completely compensated, either by controlling the temperature of that bait during the course of the draw or by exerting a mechanical pressure on the thin metal of the bait sufficient to keep it always expanded to the size of the glass cylinder to which it is attached.

Other advantages will be readily appreciated by those skilled in the art.

Each of the methods specifically described herein for maintaining uniformity in the dimensions of the bait and glass cylinder during the drawing of the latter, is characterized by the employment of a form of energy derived from a source exterior of the bait for maintaining the peripheral dimensions of the latter practically equal to the peripheral dimensions of the portions of the cylinder inclosing the bait. In the methods shown in Figs. 1, 2, 8 and 9 the contraction of the bait is controlled by the heat generated by an electric current. In Fig. 5 the bait is provided with resilient fingers which are prevented from following the contraction of the body of the bait by pressure applied to the inner periphery of the fingers.

I claim herein as my invention.

1. In a glass-drawing apparatus, the combination with a bait and drawing mechanism; of means controlled by the drawing mechanism for maintaining approximate uniformity of contraction in the bait and the glass during the drawing operation.

2. In a glass drawing apparatus, the combination of a bait, drawing mechanism, and means controlled by the drawing mechanism for regulating the contraction of the bait.

3. In a glass drawing apparatus, a sectional drawing head consisting of a central or body portion and an annular portion pivotally mounted in the central portion and carrying the bait proper.

4. In a glass drawing apparatus, a sectional bait head consisting of a central or body portion and an annular portion pivotally mounted on the central or body portion, in combination with a bait detachably connected to the annular portion.

5. In a glass-drawing apparatus, the combination with a bait and drawing mechanism, of an electric heater for the bait and an electric circuit therefor, and means for automatically reducing the electrical energy supplied to the heater during the drawing operation.

In testimony whereof, I have hereunto set my hand.

FRANK L. O. WADSWORTH.

Witnesses:
CHARLES BARNETT,
J. HERBERT BRADLEY.

Copies of this patent may be obtained for five cents each, by addressing the "Commissioner of Patents, Washington, D. C."